United States Patent
Boyd et al.

(10) Patent No.: US 6,996,029 B1
(45) Date of Patent: Feb. 7, 2006

(54) PEST REPELLER APPARATUS

(75) Inventors: Venus Boyd, Richmond Heights, OH (US); Stanley Boyd, Richmond Heights, OH (US)

(73) Assignee: Stopest Unlimited, LLC, Cleveland, OH (US)

( * ) Notice: Subject to any disclaimer, the term of this patent is extended or adjusted under 35 U.S.C. 154(b) by 0 days.

(21) Appl. No.: 11/118,716

(22) Filed: Apr. 29, 2005

(51) Int. Cl.
*H04B 1/03* (2006.01)

(52) U.S. Cl. ................................. 367/139
(58) Field of Classification Search ............... 367/139; 43/124; 116/22 A
See application file for complete search history.

(56) References Cited

U.S. PATENT DOCUMENTS

| | | | |
|---|---|---|---|
| 4,178,578 A | 12/1979 | Hall | |
| 4,414,653 A | 11/1983 | Pettinger | |
| 4,616,351 A | 10/1986 | Hall | |
| 4,802,057 A | 1/1989 | Patterson et al. | |
| 4,870,779 A | 10/1989 | Johnson et al. | |
| 4,999,818 A * | 3/1991 | Malleolo | 367/139 |
| D409,109 S | 5/1999 | Mah | |
| 5,930,946 A | 8/1999 | Mah | |
| 6,400,995 B1 | 6/2002 | Patterson et al. | |
| 2003/0194225 A1* | 10/2003 | Pedrotti et al. | 392/395 |

FOREIGN PATENT DOCUMENTS

GB        2286710 A  *  8/1995

OTHER PUBLICATIONS

"Pest Raider III", Technasonic Electronics, Inc., Lincolnwood, IL 60645, pp. 1-2, 1993.
"Pest-A-Cator Roach and Rodent Repeller"; Global Instruments Ltd., Trenton, MO 64683, pp. 1-2, 2002.
"Pest-A-Cator No Harmful Chemicals! Today's Pest Control"; Global Instruments Ltd., Trenton, MO 64683, pp. 1-2, 1999.
"Pest-A-Cator Introducing: Pest-A-Cator"; Global Instruments,Ltd., Trenton, MO 64683, pp. 1-2, 1995.
"PestConro Commonly Asked Question?"; Lentek International, Inc., Kissimmee, FL 34741, pp. 1-3, Oct. 1, 1998.
"Pest Control"; Lentek International, Inc., Kissimmee, FL 34741, pp. 1-6, 2003.
"How The Original PestContro Works"; Lentek International, Inc., Orlando, FL 32859, p. 1, dated prior to 2005.
"PestContro ULTRASONICS"; Lentek International, Inc., Orlando, FL 32859, pp. 1-2, 1999.
"Electronic Ultrasonic Pest Repeller"; Lentek International, Inc., Orlando, FL 32859, pp. 1-2, 1999.
"The Original PestContro Pest Repeller"; Lentek International, Inc., Orlando, FL 32859, pp. 1-2, 1999.
"Turn Your Entire Home Into a Giant Pest Repeller"; Lentek International. Inc., Orlando, FL 32859, pp. 1-2, 1999.
"Electronic Pest Repeller"; Black & Decker Corporation, Townson, Maryland, pp. 1-2, 2003.
"Persoanl electronic Mosquito Repellers"; Sunbeam Products, Inc., pp. 1-5, 2004.

* cited by examiner

*Primary Examiner*—Ian J. Lobo
(74) *Attorney, Agent, or Firm*—Pearne & Gordon LLP

(57) ABSTRACT

A pest repeller apparatus includes a plug engaging a housing. The housing contains an ultrasonic sound wave generating unit. The plug engages the housing such that, when the plug is plugged into a wall outlet, the housing is repositionably fixable in a plurality of positions so that, for example, the housing can be pointed at a 45 degree angle over furniture in the room.

13 Claims, 3 Drawing Sheets

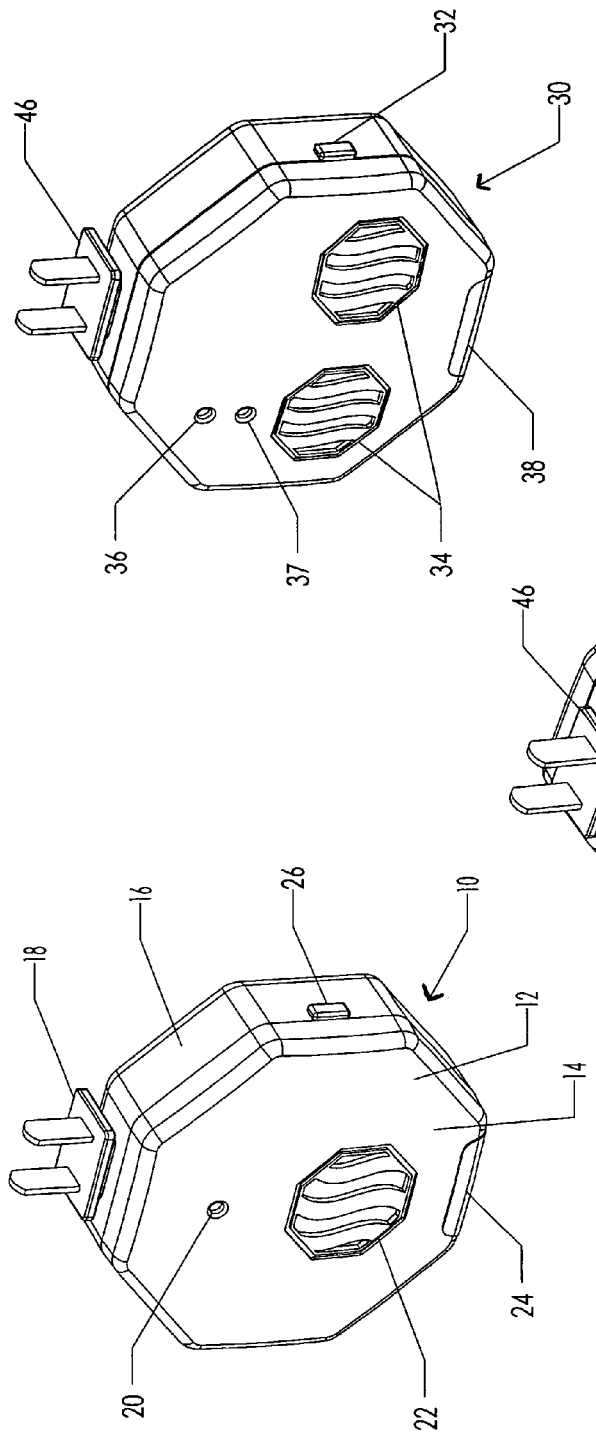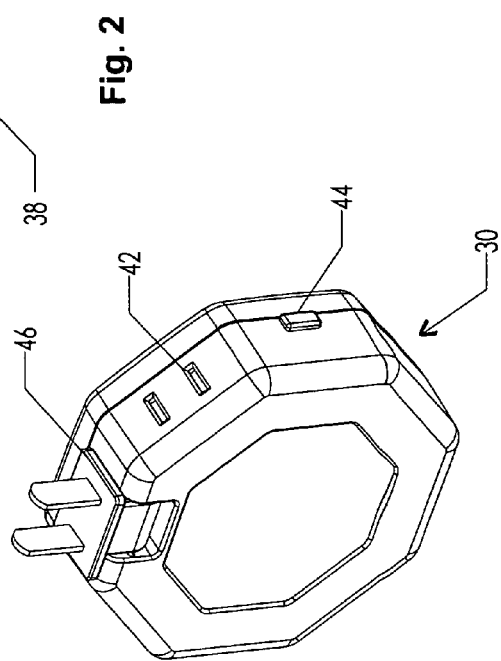

PEST REPELLER APPARATUS

FIELD OF THE INVENTION

The present invention relates to apparatus for repelling pests and more particularly to an apparatus for repelling pests utilizing ultrasonic sound waves.

BACKGROUND OF THE INVENTION

The use of ultrasonic sound waves and electromagnetic fields to repel pests is well-known. See U.S. Pat. Nos. 4,616,351; 4,178,578; 4,802,057; 4,414,653; 4,870,779; D409,109; 5,930,946; and 6,400,995 and the patents cited in the foregoing patents, the contents of all of which are incorporated herein by reference. It is known that ultrasonic sound waves at a frequency normally inaudible to humans can be effective to repel pests such as rodents, rats, mice, squirrels, bats, insects, roaches, flies, fleas, crickets, spiders, ants, bees, mosquitos, centipedes, waterbugs, and other pests. Ultrasonic sound waves irritate and repel pests, it is believed by disrupting their nervous system, affecting their feeding and communication habits, and through irritation forcing them to leave the area. It is also useful to vary and change the ultrasonic sound waves in frequency and amplitude (or loudness) so the pests are less able to habituate to it, for example, instead of using a fixed high frequency, a constant or fixed sound can be put out for 2 or more minutes, then changed to a sweeping or varying or fluctuating sound, such as higher and lower frequencies from 25 to 75 kHz, to alter the frequency and amplitude (or loudness) and prevent the pests from becoming desensitized to the irritation. When the ultrasound is increased and decreased in amplitude or loudness and frequency in random or inconsistent patterns, it is harder for the pest to adjust to the annoyance. Also, different sound waves may target different pests, for example, higher ultrasonic waves can affect smaller pests, such as insects, while lower ultrasonic waves can affect larger pests such as mammals, such as rats, mice, bats and squirrels.

It is known in the prior art to plug an ultrasonic pest repeller unit into a wall outlet or wall socket. However, these units point straight out into the room and send out or radiate ultrasonic waves in a single direction or pattern. Ultrasonic waves generally radiate out in straight lines like audible sound waves and bounce or echo off non-absorbing materials, such as hard surfaces like solid wood, cupboard doors, large appliances, ceilings, walls, stone, metal, etc. However, softer materials such as carpeting, fabric, textiles, drapes, pillows, plastic foam, flexible foam, etc. tend to absorb sound waves. Most rooms are filled with furniture and other items that tend to absorb or block or deflect or reflect incident ultrasonic sound waves, leaving "shadow" areas on the far side of the furniture or other obstruction where the ultrasonic waves don't get to, leaving pests in those areas unirritated and unrepelled. The present invention is directed at reducing this problem.

SUMMARY OF THE INVENTION

A pest repeller apparatus is provided which comprises a housing and a plug. The plug is adapted to plug into a wall outlet in a room to provide electric power to the housing. The housing contains a ultrasonic sound wave generating unit. The plug engages the housing such that, when the plug is plugged into the wall outlet, the housing is repositionably fixable in a plurality of positions.

BRIEF DESCRIPTION OF THE DRAWINGS

FIG. 1 is a perspective view of a pest repeller apparatus according to the invention.

FIG. 2 is a front perspective view of an alternative embodiment of a pest repeller apparatus according to the invention.

FIG. 3 is a back perspective view of the apparatus of FIG. 2.

DETAILED DESCRIPTION OF THE PREFERRED EMBODIMENTS OF THE INVENTION

Figure 4:
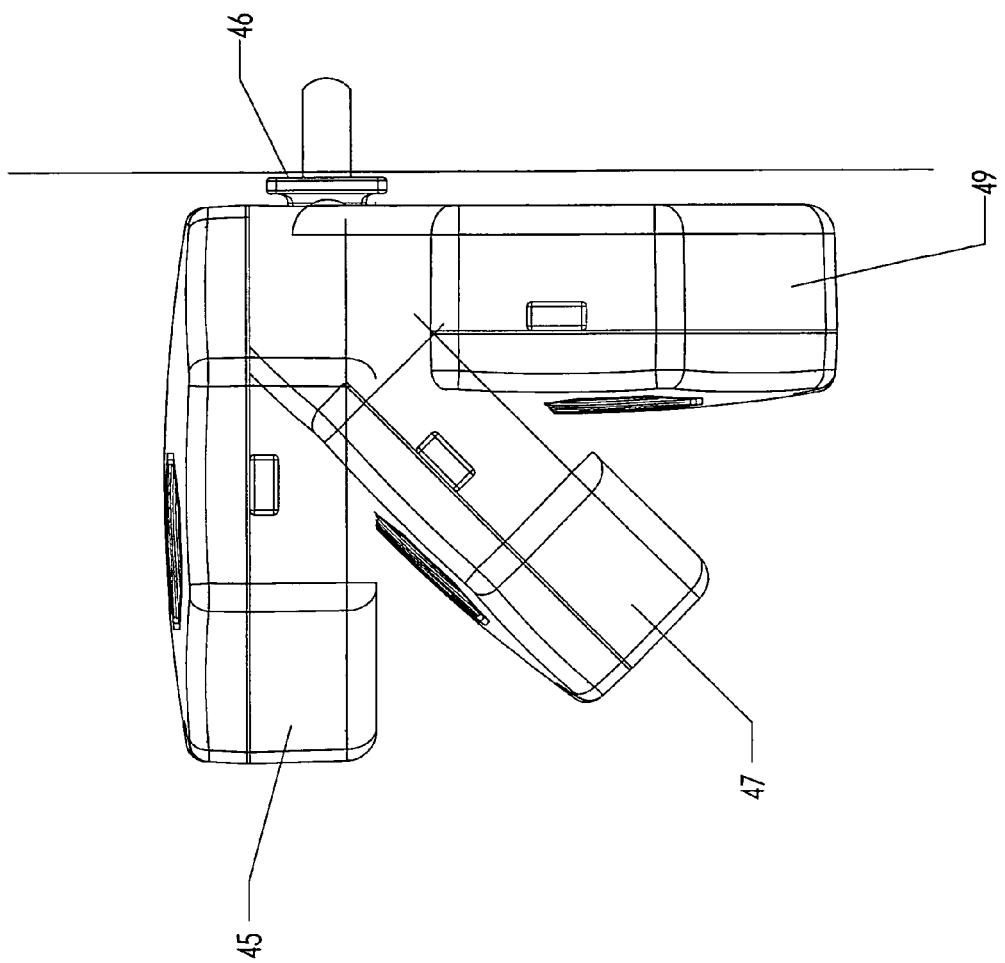
FIG. 4 is a side elevational view of an apparatus according to the invention plugged into a wall outlet with the apparatus shown in three different orientations.

With reference to FIG. 1, there is shown a pest repeller apparatus 10 having a plastic housing 12 including a front housing 14 and a back housing 16 in a conventional clamshell arrangement. Apparatus 10 includes a mostly plastic plug 18 that is plugged into a conventional wall outlet to supply AC electric power (typically 110–120 V) to the apparatus 10. Apparatus 10 also includes a LED light 20 which is illuminated when the unit is operating, and speaker 22 through which ultrasonic sound waves are emitted from the unit, a light 24 that functions like a night light and is preferably on whenever the unit is plugged in, and a test button 26 to test the unit. Inside the apparatus 10, but not shown in the drawings, is a conventional ultrasonic sound wave generating unit or apparatus as known in the art to generate and emit ultrasonic sound waves. (See, for example, conventional units sold by Lentek International, Inc. (www.lentek.com), Technasonic Electronics, Inc., Global Instruments Ltd. (wvw.global-instruments.com). and Black & Decker (www.blackanddecker.com), the contents and teachings of which are incorporated herein by reference.) See also, for example, the ultrasonic units described in the patents mentioned above, the contents of which are incorporated herein by reference. Any of the ultrasonic sound wave generators known in the art can be used in a conventional way in the present apparatus. Typically the ultrasonic output or sound pressure level is up to 85 db or 110 db or 120–125 db measured at 0.5 m, with a power input of 100–120 V and with a frequency range of 20–85 kHz. As known in the art, the ultrasonic generator unit inside the apparatus is oriented so that the ultrasonic sound waves come out the speaker 22 or speakers 34.

With reference to FIGS. 2 and 3 there is shown a pest repeller apparatus 30 similar to apparatus 10 including the ultrasonic sound wave generator apparatus but also incorporating and including a conventional electromagnetic pest repeller feature. Apparatus 30 has a plug 46 the same as plug 18, a test button 32, a light 38 which is a night light, dual speakers 34 like speaker 22, LED 36 which, by lighting up, shows when the ultrasonic feature is functioning, LED 37 which shows when the electromagnetic feature is functioning, ultrasonic on-off button 44, and a plug-in socket 42, like others known in the art to plug in other electric appliances. Inside the apparatus 30 but not shown in the drawings is a conventional ultrasonic sound wave generator as described above and also a conventional electromagnetic field generating apparatus as known in the art to generate and provide a pulsating electromagnetic field throughout the wiring of the home or building altering the magnetic field that already exists around the wiring to a level that causes stress, such as stress to the central nervous system, to the pests and rodents living near the wiring. Pests nest and breed within the walls and the pulsating electromagnetic feature irritates them and drives them out. The electromagnetic function runs continuously when the unit is plugged in a standard outlet, providing constant protection even when the ultrasonic function is turned off. The pulsating electromagnetic field generating apparatus is as known in the art, such as is described and taught in the references mentioned above relating to the ultrasonic sound wave apparatus, for example U.S. Pat. No. 6,400,995. The electromagnetic apparatus can, for example, generate a pulsed output at a frequency of about one pulse per second, with the pulses being periodically stopped for an interim period. The apparatus induces a pulsed, interrupted electromagnetic field onto the power lines and wiring such that the entire home/building wiring system becomes a radiator for the pulsed and interrupted electromagnetic field. Thus the ultrasonic feature and the electromagnetic feature are complementary; the electromagnetic feature drives pests out of the walls where the wiring is and the ultrasonic feature drives them out of the room.

FIG. 4 is a side view showing the apparatus having the plug 46 plugged into a wall outlet in a room, the wall outlet facing or projecting outwardly from a substantially vertical wall in a conventional manner, with the housing shown in three different orientations. The housing is releasably or repositionably held or fixed or locked in these different orientations by elements such as those shown in FIGS. 5–7. When the housing is fixed in the position as shown at 49, the apparatus is pointed horizontally out into the room just like all the prior art ultrasonic pest repellers and aims the ultrasonic waves horizontally out into the room. However, in many cases the ultrasonic waves run into furniture, appliances, etc. in the room and are absorbed and/or deflected such that shadow areas on the far side of the obstruction are created. Pests in these shadow areas escape or substantially avoid the irritation of the ultrasonic waves. To reduce this problem the apparatus of the present invention is provided with an adjustable plug or adjustable housing feature. The housing can be rotated into a plurality of other positions, such as shown at 47, when the housing is rotated and fixed in a position pointing upwards at a substantially 45 degree angle above the horizontal. In this manner the ultrasonic waves can be aimed over and above furniture which might be in the way and more of the ultrasonic waves can hit the ceiling and walls and reflect or bounce off these hard surfaces and reduce the shadow areas described above. If there is a piece of furniture right in front of the apparatus, the housing can be rotated to the position shown at 45, wherein the apparatus or housing is pointed substantially vertically upwards, substantially straight up at the ceiling. In this way the ultrasonic waves are not pointed right at a piece of furniture, but are pointed up at the ceiling so they can avoid the furniture and bounce off the ceiling where there are few obstructions, thus obtaining a ricochet pattern which will increase effective coverage and more effectively get at the pests.

Figure 5:
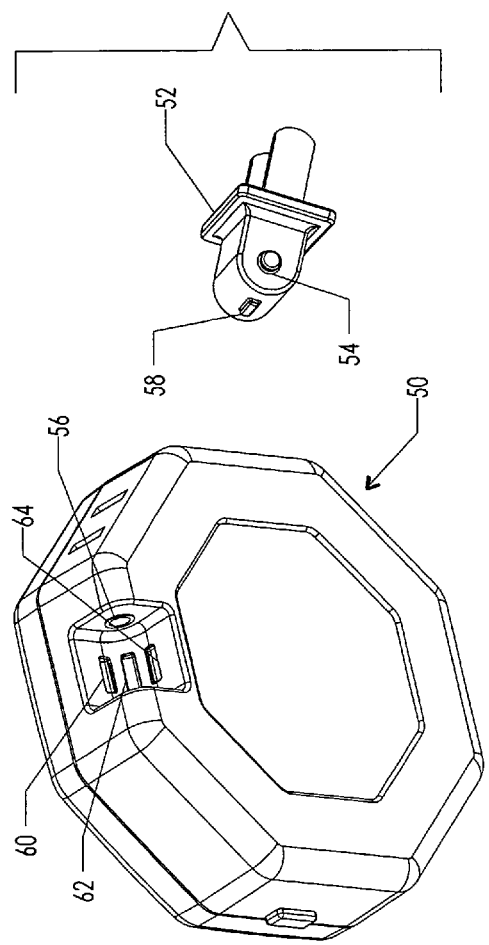
FIG. 5 is an exploded view of a pest repeller apparatus similar or identical to the apparatus of FIGS. 1–3.
Figure 6:
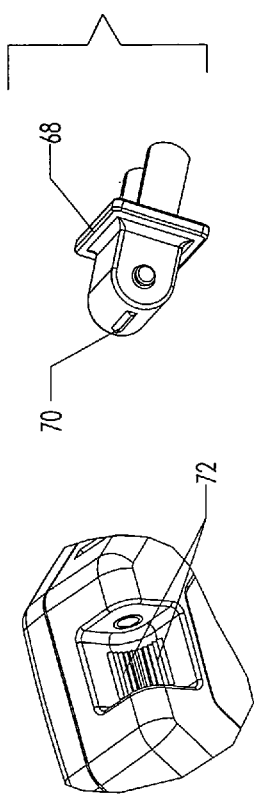
FIG. 6 is an exploded view of an alternative embodiment of the invention with most of the housing cut away.
Figure 7:
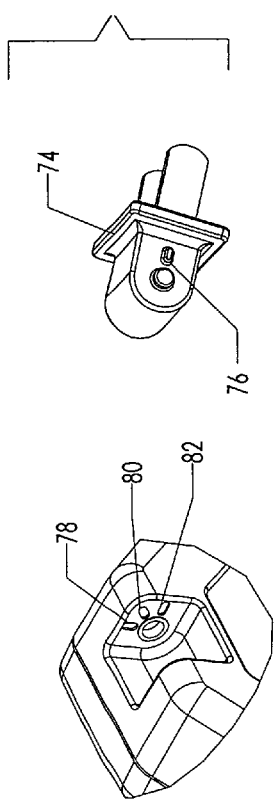
FIG. 7 is an exploded view of an alternative embodiment of the invention with most of the housing cut away.

FIGS. 5–7 show constructions so that the adjustable plug can be adjusted so that the housing 12 can be pointed at any angle from horizontal (i.e., straight out into the room) to vertical (i.e., straight up at the ceiling) to avoid furniture or other obstructions in the room. As shown in FIGS. 5–7, the plug engages the housing such that, when the plug is plugged into the wall outlet, the housing is repositionably fixable in a plurality of positions. With reference to FIG. 5, there is shown a plug 52, like plugs 18, 46, having an axial projection 54 on each side of the plug (about which the plug 52 can rotate) and a projection or rib 58. The plug 52 is mounted in a recess in housing 50 (the same as housing 12) with each projection 54 extending into a corresponding cavity in collar 56 (housing 50 having a collar 56 on each side of the recess) so that plug 52 can rotate inside the recess. Projection 54 and collar 56 are each partially or completely metal so that there is metal-to-metal contact. Thus the metal prongs of the plug 52 are electrically coupled to projection or projections 54, which are electrically coupled to collar or collars 56, which are electrically coupled to the ultrasonic and electromagnetic apparatus inside the housing. Alternatively, electrical power can be provided inside the housing via a flexible wire running from plug 52 to housing 50, or via other means or elements known in the art.

When projection 58 engages or is releasably and repositionably fixed in cavity 60, the housing 50 points horizontally out into the room. When projection 58 engages cavity 62 and cavity 64, respectively, the housing is pointed at a substantially 45 degree angle upwards, and substantially vertically or straight up at the ceiling, respectively.

FIG. 6 is the same as FIG. 5, except that part of the housing 50 is cut away and plug 68 has a projection or rib 70 which is triangular in cross section and is engageable at many positions or angles (throughout a 90 degree arc) with a series of cavities defined by thin ribs 72 in the recess of the housing. In this way the housing can be placed at many different angles or positions (for example, at least 3, 4, 5, 6, 7, 8, 9, 10, 11, 12, 14, or 15 positions or angles) between horizontal and vertical or beyond.

FIG. 7 is the same as FIG. 6, except that plug 74 has a projection 76 on each side of plug 74 that are engageable with corresponding cavities 78, 80, 82 located on each sidewall of the plug-receiving cavity or recess at the top of the housing. When the projections 76 engage the cavities 78, 80, 82, the housing is repositionably fixed at different angles as described above. In addition to the constructions shown in FIGS. 5–7, other constructions as known in the art can also be employed to make the housing rotatable with respect to the plug and releasably and repositionably lockable or releasably and repositionably fixable in different positions so that the housing can be releasably or repositioably locked or fixed in different positions and pointed at different angles from horizontal to vertical as described above. For example, the projections can be on the housing and the cavity or cavities can be on the plug.

Although the preferred embodiments of the invention have been shown and described, it should be understood that various modifications, changes and rearrangements may be resorted to without departing from the scope of the invention as disclosed and claimed herein.

What is claimed is:

1. A pest repeller apparatus comprising a housing and a plug, the plug having at least one prong extending therefrom, the prong having a longitudinal axis, the plug being adapted to plug into a wall outlet in a room to provide electric power to the housing, the housing containing an ultrasonic sound wave generating unit, the plug engaging the housing such that, when the plug is plugged into the wall outlet, the housing is rotatable about an axis substantially perpendicular with the longitudinal axis of the prong and is repositionably fixable in a plurality of positions.

2. The apparatus of claim 1, said housing having a front face wherein, when the plug is plugged into the wall outlet, the housing is repositionably fixable (a) in a position wherein the front face is facing substantially horizontally and (b) in a position wherein the front face is facing substantially 45 degrees above the horizontal and (c) in a position wherein the front face is facing substantially vertically.

3. The apparatus of claim 1, said housing having a front face wherein, when the plug is plugged into the wall outlet, the housing is repositionably fixable in a position wherein the front face is facing substantially vertically.

4. The apparatus of claim 1, the plug engaging the housing such that, when the plug is plugged into the wall outlet, the housing is repositionably fixable in at least 3 positions.

5. The apparatus of claim 1, the plug engaging the housing such that, when the plug is plugged into the wall outlet, the housing is repositionably fixable in at least 4 positions.

6. The apparatus of claim 1, the plug engaging the housing such that, when the plug is plugged into the wall outlet, the housing is repositionably fixable in at least 5 positions.

7. The apparatus of claim 1, the plug engaging the housing such that, when the plug is plugged into the wall outlet, the housing is repositionably fixable in at least 7 positions.

8. The apparatus of claim 1, the plug engaging the housing such that, when the plug is plugged into the wall outlet, the housing is repositionably fixable in at least 10 positions.

9. The apparatus of claim 1, wherein said housing also contains an electromagnetic field generating apparatus.

10. The apparatus of claim 1, wherein the plug and the housing engage each other at least via a projection engaging a cavity.

11. The apparatus of claim 1, wherein the plug has a rib which is repositionably engageably in at least 7 positions with a plurality of ribs on the housing.

12. The apparatus of claim 1, the housing having a plug-in socket to receive a plug from another electric appliance.

13. The apparatus of claim 1, said housing having a front face wherein, when the plug is plugged into the wall outlet, the housing is repositionably fixable in a position wherein the front face is facing substantially 45 degrees above the horizontal.

\* \* \* \* \*